(12) United States Patent
Otuka (10) Patent No.: US 8,416,328 B2
(45) Date of Patent: Apr. 9, 2013

(54) IMAGE PROCESSING APPARATUS AND IMAGE PROCESSING METHOD FOR PROCESSING BAYER PATTERN IMAGE DATA

(75) Inventor: Kazuyoshi Otuka, Kanagawa (JP)

(73) Assignee: Honda Elesys Co., Ltd., Yokohama (JP)

( * ) Notice: Subject to any disclaimer, the term of this patent is extended or adjusted under 35 U.S.C. 154(b) by 94 days.

(21) Appl. No.: 12/929,463

(22) Filed: Jan. 26, 2011

(65) Prior Publication Data

US 2011/0181762 A1    Jul. 28, 2011

(30) Foreign Application Priority Data

Jan. 26, 2010  (JP) ................ P.2010-014270

(51) Int. Cl.
*H04N 3/14*  (2006.01)
*H04N 5/335* (2006.01)
*H04N 9/04*  (2006.01)

(52) U.S. Cl. .................. 348/273; 348/272; 348/280

(58) Field of Classification Search ............ 348/272, 348/273, 280
See application file for complete search history.

(56) References Cited

U.S. PATENT DOCUMENTS

| 5,506,619 | A |   | 4/1996 | Adams, Jr. et al. |   |
|---|---|---|---|---|---|
| 5,629,734 | A |   | 5/1997 | Hamilton, Jr. et al. |   |
| 5,652,621 | A |   | 7/1997 | Adams, Jr. et al. |   |
| 2004/0141065 | A1 | * | 7/2004 | Hara et al. | 348/208.11 |
| 2006/0078324 | A1 | * | 4/2006 | Yasuda et al. | 396/299 |
| 2006/0268431 | A1 | * | 11/2006 | Jin | 359/726 |

FOREIGN PATENT DOCUMENTS

JP        2007-18154        1/2007

* cited by examiner

*Primary Examiner* — Usman Khan (57) ABSTRACT

According to the embodiments, there is provided an image processing apparatus including: an acquisition section configured to acquire 3×3 pixel block data to have one red pixel at a center; an estimation section configured to compute blue value differences between blue values of diagonal pairs of blue pixels in the block data, and to estimate a direction of a contrast boundary based on the blue value differences; and a processing section configured to compute a computed blue value based on the blue values of the four blue pixels within the block data according to the estimated direction of the contrast boundary, to compute a computed green value based on green values of two green pixels within the block data, and to output a color image pixel to have a red value of the red pixel and the computed blue and green values.

8 Claims, 8 Drawing Sheets

*FIG. 8C*

IMAGE PROCESSING APPARATUS AND IMAGE PROCESSING METHOD FOR PROCESSING BAYER PATTERN IMAGE DATA

CROSS-REFERENCE TO RELATED APPLICATION(S)

This application claims priority from Japanese Patent Application No. 2010-014270 filed on Jan. 26, 2010, the entire contents of which are incorporated herein by reference.

FIELD

Embodiments described herein relate to an image processing apparatus and image processing method for performing demosaicing processing.

BACKGROUND

For example, lane markings are provided for designating vehicle lanes on a road surface. There is known a lane marking recognition apparatus for recognizing such lane markings in an image of the road captured by a vehicle-installed forward-imaging camera (see, for example, JP-2007-018154-A). For example, a single solid-state image capture element which generates Bayer pattern array gray-scale image data (called RAW data) may be used as a vehicle-installed camera in a lane marking recognition apparatus. For the RAW data, demosaicing processing is performed to estimate/interpolate unavailable red values (R), green values (G) and blue values (B) for each pixel, thereby generating RGB color image data (see, for example, U.S. Pat. No. 5,506,619-B, U.S. Pat. No. 5,629,734-B and U.S. Pat. No. 5,652,621-B). Such demosaicing process will be performed in the image capture apparatus or in the following-stage image processing apparatus. The lane marking recognition apparatus of JP-2007-018154-A also includes image acquisition means for performing demosaicing processing on a video signal supplied from a color video camera.

Recently Quad-VGA size (1280 pixel×960 pixel) and SXGA size (1280 pixel×1024 pixel) CMOS imaging sensors have become relatively low cost and are becoming more common that, for example, perform demosaicing processing on RAW data from a Quad-VGA size Bayer pattern array, reducing the frame size to VGA size (640 pixel×480 pixel). Such frame-size-reducing demosaicing processing is referred to below as resolution degradation demosaicing processing.

Figure 7A:
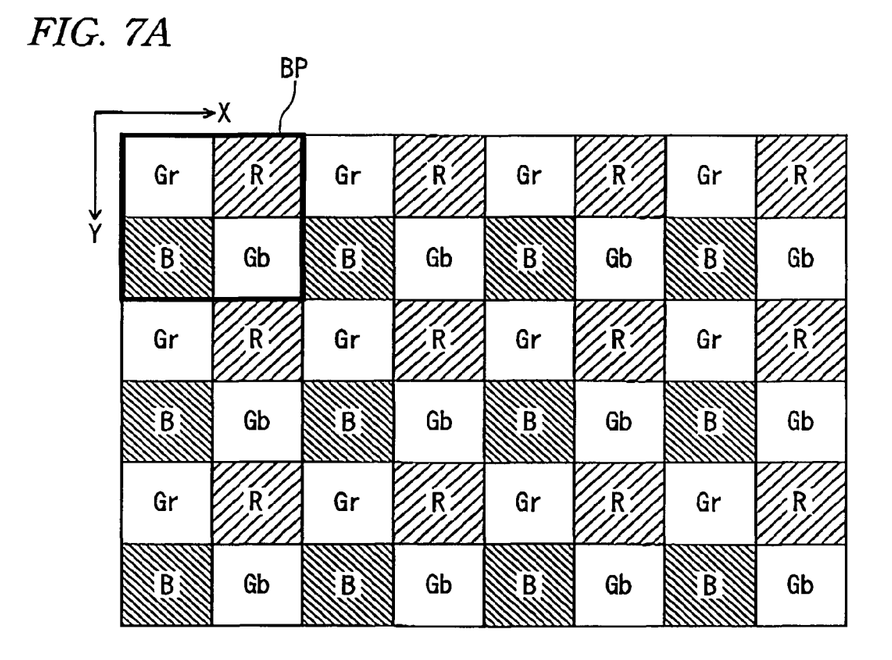
FIGS. 7A and 7B illustrate base Bayer pattern array RAW data and primary RGB color image data derived by subjecting the RAW data to resolution degradation demosaicing processing.
Figure 7B:
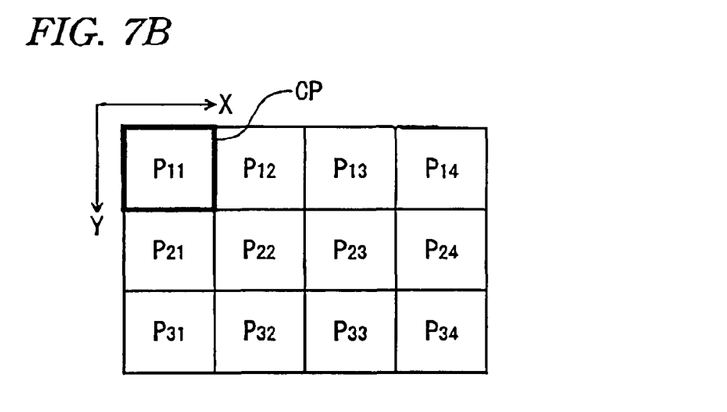

Brief explanation follows regarding an example of related-art resolution degradation demosaicing processing. FIGS. 7A and 7B illustrate, respectively, base Bayer pattern array RAW data and primary RGB color image data resulting from resolution degradation demosaicing processing this RAW data. In FIG. 7A, pixels R are red pixels, pixels B are blue pixels, and pixels Gr and pixels Gb are green pixels. The pixels Gr are located within R-pixel lines in the X direction (horizontal direction), and the pixels Gb are located within B-pixel lines in the X direction. In FIG. 7A, the 2×2 pixel array containing the top-left pixel Gr, the top-right pixel R, the bottom-left pixel B and the bottom-right pixel Gb is a base pixel pattern. In FIG. 7B, the pixels $P_{ij}$ (where i and j are positive integers) are pixels after resolution degradation demosaicing processing.

The pixel CP in FIG. 7B is the pixel for the base pixel pattern BP of FIG. 7A after resolution degradation demosaicing processing. In this resolution degradation demosaicing processing, for example, each of the values of the pixel R and the pixel B of the base pixel pattern BP is taken as the red value and blue value of the pixel CP, respectively, and the average value of the values of the pixel Gr and the pixel Gb of the base pixel pattern BP is taken as the green value of the pixel CP.

Namely, by performing the resolution degradation demosaicing processing, reduced-size color image data is generated from the RAW data to be half the frame size in both the X direction and the Y direction.

Figure 8A:
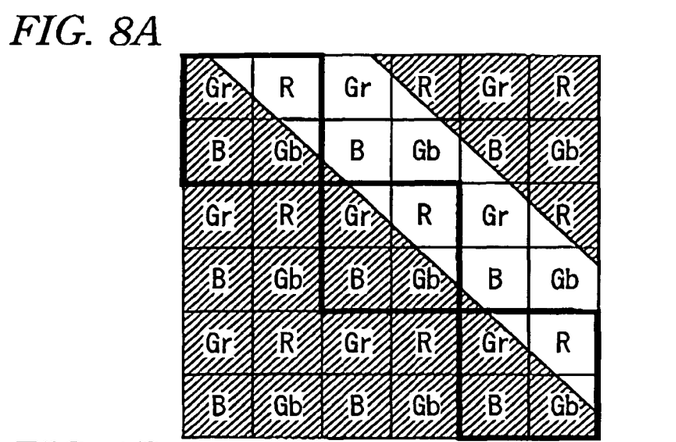
FIGS. 8A to 8C illustrate false yellow color generation in color image data.
Figure 8B:
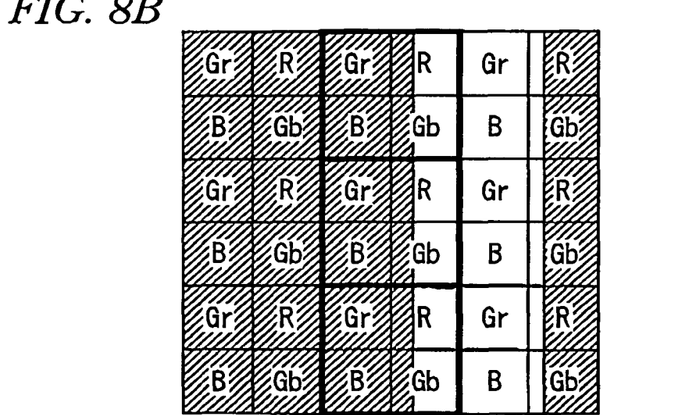
Figure 8C:
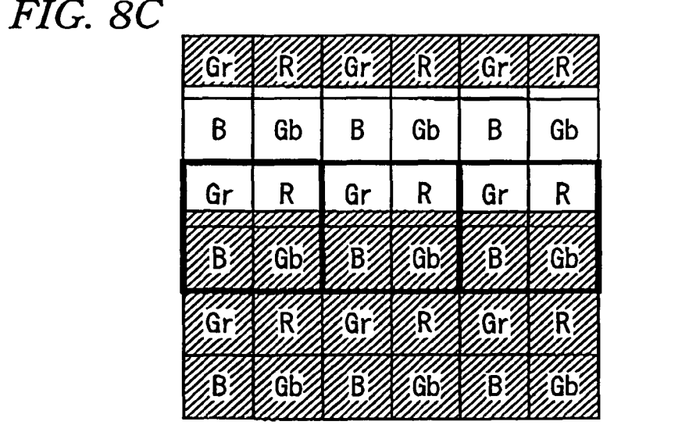

However, depending on the pattern of the image, false color is sometimes generated in the color image data after the resolution degradation demosaicing processing as described above. For example, in a lane marking recognition apparatus, image data of a road surface may be captured by an image capture apparatus, and the resolution degradation demosaicing processing may be performed on the captured image data. In this case, false yellow color will be generated in the color image data for the image patterns, as shown in FIGS. 8A to 8C. FIG. 8A exemplarily illustrates a Bayer pattern array for a diagonal white line, FIG. 8B exemplarily illustrates a Bayer pattern array for a vertical white line, and FIG. 8C exemplarily illustrates a Bayer pattern array for a horizontal white line. In all cases, the brightness of pixels corresponding to the road surface other than at the white line is lower than the brightness of pixels corresponding to the white line. In such image pattern, when resolution degradation demosaicing processing is performed on a base pixel pattern having a large R pixel value and a small B pixel value, due to the red pixel R and the green pixel Gr/Gb, a yellow component that does not really exist is generated. Namely, false yellow color is generated. In each of the examples shown in FIGS. 8A to 8C a yellow line is generated at the edge portion of the white line (the portions inside the bold lines).

Such false yellow color can also be generated by portions where white lines on the road surface are wearing/flaking or cracks have developed in the white lines due to the passage of vehicles. False yellow color also readily occurs around edges of the bodies of white vehicles traveling on the road.

There are also other lane markings on the road surface in addition to white lines, such as yellow lines, transverse lines, Bott's dots, and cat's eyes. Bott's dots are circular plates of about 10 cm diameter with a raised height of 1 cm, and plural Bott's dots are provided on vehicle lane dividing lines or on hypothetical lines where vehicle lanes should be divided. Cat's eyes are substantially rectangular shaped reflective bodies, with plural cat's eyes provided for dividing vehicle lanes.

When a lane marking recognition apparatus employs color image data generated by the related-art resolution degradation demosaicing processing for recognizing lane markings, false yellow color may be present in the color image data, and false-positive recognition and/or a degradation in lane marking detection precision may occur.

SUMMARY

According to the embodiments described herein, there is provided an image processing apparatus and an image processing method with resolution degradation demosaicing processing that effectively suppresses generation of false yellow color.

According to a first aspect of the embodiments, there is provided an image processing apparatus including: a block data acquisition section configured to receive image data in which rows of alternately disposed blue pixels and green pixels and rows of alternately disposed green pixels and red pixels are alternately disposed along a column direction, and to acquire 3×3 pixel block data from the image data to have one red pixel positioned at a center, four blue pixels positioned at corners and four green pixels positioned respectively at above/below/left/right portions of the center; a contrast boundary estimation section configured to compute blue value differences between blue values of diagonal pairs of the blue pixels in the block data, and to estimate a direction of a contrast boundary in the block data based on the blue value differences; and a pixel interpolation processing section configured to compute a computed blue value based on the blue values of the four blue pixels within the block date according to the estimated direction of the contrast boundary, to compute a computed green value based on green values of two green pixels within a 2×2 pixel pattern contained in the block data, and to output a color image pixel correspondingly with the pixel pattern to have (1) a red value of the red pixel, (2) the computed blue value and (3) the computed green value.

According to a second aspect of the embodiments, there is provided an image processing apparatus including: a block data acquisition section configured to receive image data in which rows of alternately disposed blue pixels and green pixels and rows of alternately disposed green pixels and red pixels are alternately disposed along a column direction, and to acquire 3×3 pixel block data from the image data to have one blue pixel positioned at a center, four red pixels positioned at corners and four green pixels positioned respectively at above/below/left/right portions of the center; a contrast boundary estimation section configured to compute red value differences between red values of diagonal pairs of the red pixels in the block data, and to estimate a direction of a contrast boundary in the block data based on the red value differences; and a pixel interpolation processing section configured to compute a computed red value based on the red values of the four red pixels within the block data according to the estimated direction of the contrast boundary, to compute a computed green value based on green values of two green pixels within a 2×2 pixel pattern contained in the block data, and to output a color image pixel correspondingly with the pixel pattern to have (1) a blue value of the blue pixel, (2) the computed red value and (3) the computed green value.

According to a third aspect of the embodiments, there may be provided the image processing apparatus, wherein the contrast boundary estimation section computes green value differences between the green values of vertical and horizontal pairs of the green pixels in the block data, wherein the contrast boundary estimation section estimates a first contrast boundary direction from the blue difference values and a second contrast boundary direction from the green difference values, and wherein the pixel interpolation processing section computes the computed blue value based on the blue values of the four blue pixels within the block data according to the first contrast boundary direction, and computes the computed green value based on the green values of the two green pixels within the pixel pattern according to the second contrast boundary direction.

According to a fourth aspect of the embodiments, there may be provided the image processing apparatus, wherein the contrast boundary estimation section computes green value differences between the green values of vertical and horizontal pairs of the green pixels in the block data, wherein the contrast boundary estimation section estimates a first contrast boundary direction from the blue difference values and a second contrast boundary direction from the green difference values, and wherein the pixel interpolation processing section computes the computed green value based on the green values of the horizontal pair of the green pixels within the 3×3 pixel data block while weighting the green value of the green pixel within the 2×2 pixel pattern when the second contrast boundary direction is estimated to be in a horizontal direction, and computes the computed green value based on the green values of the vertical pair of the green pixels within the 3×3 pixel data block while weighting the green value of the green pixel within the 2×2 pixel pattern when the second contrast boundary direction is estimated to be in a vertical direction.

According to a fifth aspect of the embodiments, there may be provided the image processing apparatus, wherein the contrast boundary estimation section computes green value differences between the green values of vertical and horizontal pairs of the green pixels in the block data, wherein the contrast boundary estimation section estimates a first contrast boundary direction from the red difference values and a second contrast boundary direction from the green difference values, and wherein the pixel interpolation processing section computes the computed red value based on the red values of the four red pixels within the block data according to the first contrast boundary direction, and computes the computed green value based on the green values of the two green pixels within the pixel pattern according to the second contrast boundary direction.

According to a sixth aspect of the embodiments, there may be provided the image processing apparatus, wherein the contrast boundary estimation section computes green value differences between the green values of vertical and horizontal pairs of the green pixels in the block data, wherein the contrast boundary estimation section estimates a first contrast boundary direction from the red difference values and a second contrast boundary direction from the green difference values, and wherein the pixel interpolation processing section computes the computed green value based on the green values of the horizontal pair of the green pixels within the 3×3 pixel data block while weighting the green value of the green pixel within the 2×2 pixel pattern when the second contrast boundary direction is estimated to be in a horizontal direction, and computes the computed green value based on the green values of the vertical pair of the green pixels within the 3×3 pixel data block while weighting the green value of the green pixel within the 2×2 pixel pattern when the second contrast boundary direction is estimated to be in a vertical direction.

According to a seventh aspect of the embodiments, there is provided an image processing method including: receiving image data in which rows of alternately disposed blue pixels and green pixels and rows of alternately disposed green pixels and red pixels are alternately disposed along a column direction; acquiring 3×3 pixel block data from the image data to have one red pixel positioned at a center, four blue pixels positioned at corners and four green pixels positioned respectively at above/below/left/right portions of the center; computing blue value differences between blue values of diagonal pairs of the blue pixels in the block data; estimating a direction of a contrast boundary in the block data based on the blue value differences; computing a computed blue value based on the blue values of the four blue pixels within the block data according to the estimated direction of the contrast boundary; computing a computed green value based on green values of two green pixels within a 2×2 pixel pattern contained in the block data; and outputting a color image pixel correspondingly with the pixel pattern to have (1) a red value of the red pixel, (2) the computed blue value and (3) the computed green value.

According to an eighth aspect of the embodiments, there is provided an image processing method including: receiving image data in which rows of alternately disposed blue pixels and green pixels and rows of alternately disposed green pixels and red pixels are alternately disposed along a column direction; acquiring 3×3 pixel block data from the image data to have one blue pixel positioned at a center, four red pixels positioned at corners and four green pixels positioned respectively at above/below/left/right portions of the center; computing red value differences between red values of diagonal pairs of the red pixels in the block data; estimating a direction of a contrast boundary in the block data based on the red value differences; computing a computed red value based on the red values of the four red pixels within the block data according to the estimated direction of the contrast boundary; computing a computed green value based on green values of two green pixels within a 2×2 pixel pattern contained in the block data; and outputting a color image pixel correspondingly with the pixel pattern to have (1) a blue value of the blue pixel, (2) the computed red value and (3) the computed green value.

According to embodiments described herein, false yellow color can be efficiently suppressed from occurring in resolution degradation demosaicing processing.

DETAILED DESCRIPTION

Embodiments will be described in detail with reference to the drawings.

First Embodiment

Figure 1:
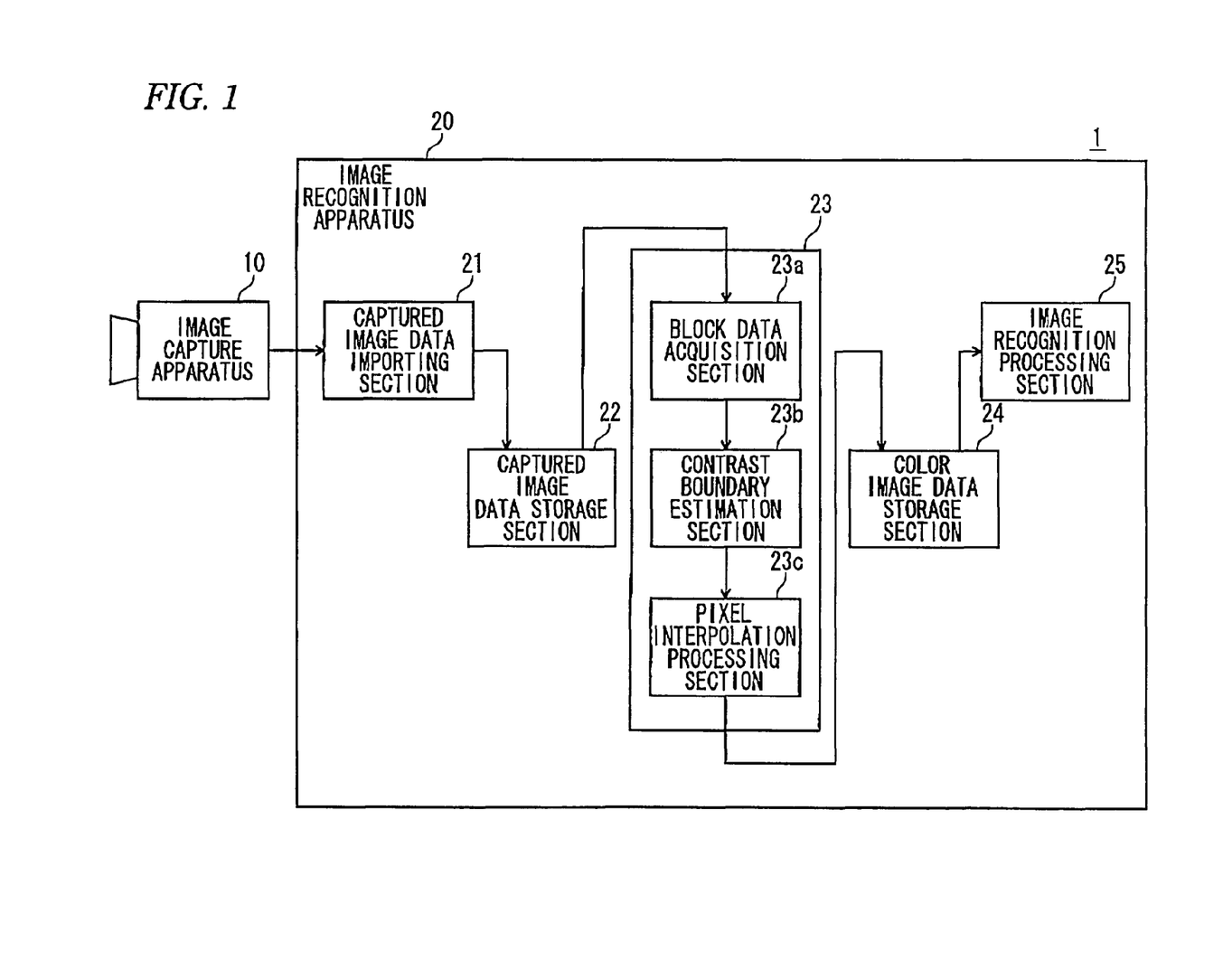
FIG. 1 illustrates a functional configuration of an image recognition system including an image recognition apparatus applied to an image processing apparatus in a first embodiment to a fourth embodiment.

FIG. 1 illustrates a functional configuration of an image recognition system including an image recognition apparatus applied as an image processing apparatus of a first embodiment. In FIG. 1, an image recognition system 1 includes an image capture apparatus 10 and an image recognition apparatus 20.

The image capture apparatus 10 is a digital camera disposed on a vehicle so as to be capable of forward capture of an image of the road surface on which the vehicle is traveling. The image capture apparatus 10 includes a single solid-state image capture element. The image capture element is, for example, a CMOS imaging sensor. The image capture element captures an image of the imaging subject focused through an image capture lens and generates image capture data, this being RAW data of a Quad-VGA size Bayer pattern array. In the present embodiment, the RAW data Bayer pattern array has a pixel array as shown in FIG. 7A. Namely, in the RAW data, a pixel array has rows of alternately disposed pixels B and pixels Gb and rows of alternately disposed pixels Gr and pixels R, and these respective rows are alternately disposed along a column direction. RAW data is generated in the image capture apparatus 10 at a specific frame rate (for example 15 frames/second) and supplied to the image recognition apparatus 20.

The image recognition apparatus 20 serially imports the RAW data supplied from the image capture apparatus 10, performs resolution degeneration demosaicing processing to generate, for example, VGA size color image data, and detects for lane markings in the color image data, such as white lines, yellow lines, transverse lines, Bott's dots and cat's eyes.

As shown in FIG. 1, the image recognition apparatus 20 includes a captured image data importing section 21, a captured image data storage section 22, a demosaicing processing section 23, a color image data storage section 24 and an image recognition processing section 25.

The captured image data importing section 21 imports RAW data supplied from the image capture apparatus 10 and stores the RAW data in the captured image data storage section 22.

The captured image data storage section 22 is Random Access Memory (RAM) for storing 4 lines worth of RAW data or more, for example a line memory.

The demosaicing processing section 23 reads the RAW data stored in the captured image data storage section 22, reduces the frame size and performs demosaicing processing according to the contrast boundaries of the image to generate color image data, and stores the color image data in the color image data storage section 29. The image processing apparatus of the present embodiment includes the demosaicing processing section 23 of the image recognition apparatus 20. In the present embodiment, the demosaicing processing section 23 generates VGA size color image data from the Quad-VGA size Bayer pattern array RAW data.

The demosaicing processing section 23 is, for example, configured by a Central Processor Unit (CPU), and by reading and executing a demosaicing processing program stored in a non-illustrated memory, the demosaicing processing section 23 has a functional configuration including a block data acquisition section 23a, a contrast boundary estimation section 23b and an pixel interpolation processing section 23c.

The block data acquisition section 23a reads 3×3 pixel block data containing a single individual base pixel pattern (2×2) from the RAW data stored in the captured image data storage section 22. Detailed explanation is given later regarding the block data pixel configuration.

On receipt of the block data supplied from the block data acquisition section 23a, the contrast boundary estimation section 23b analysis the density in the block data and estimates a direction of a contrast boundary.

The pixel interpolation processing section 23c interpolates pixels of the base pixel pattern contained in the block data according to the block data contrast boundary direction estimated by the contrast boundary estimation section 23b, generates 1-pixel's worth of color image data and stores the color image data in the color image data storage section 24.

The color image data storage section 24 is RAM for storing 4 lines worth of color image data or more, for example a line memory.

The image recognition processing section 25 reads the color image data stored in the color image data storage section 24, and detects for lane markings included in the color image data. The image recognition processing section 25 detects for lane markings by performing known pattern matching processing that searches for objects matching the shape and color of various lane markings pre-stored as color image data.

Figure 2:
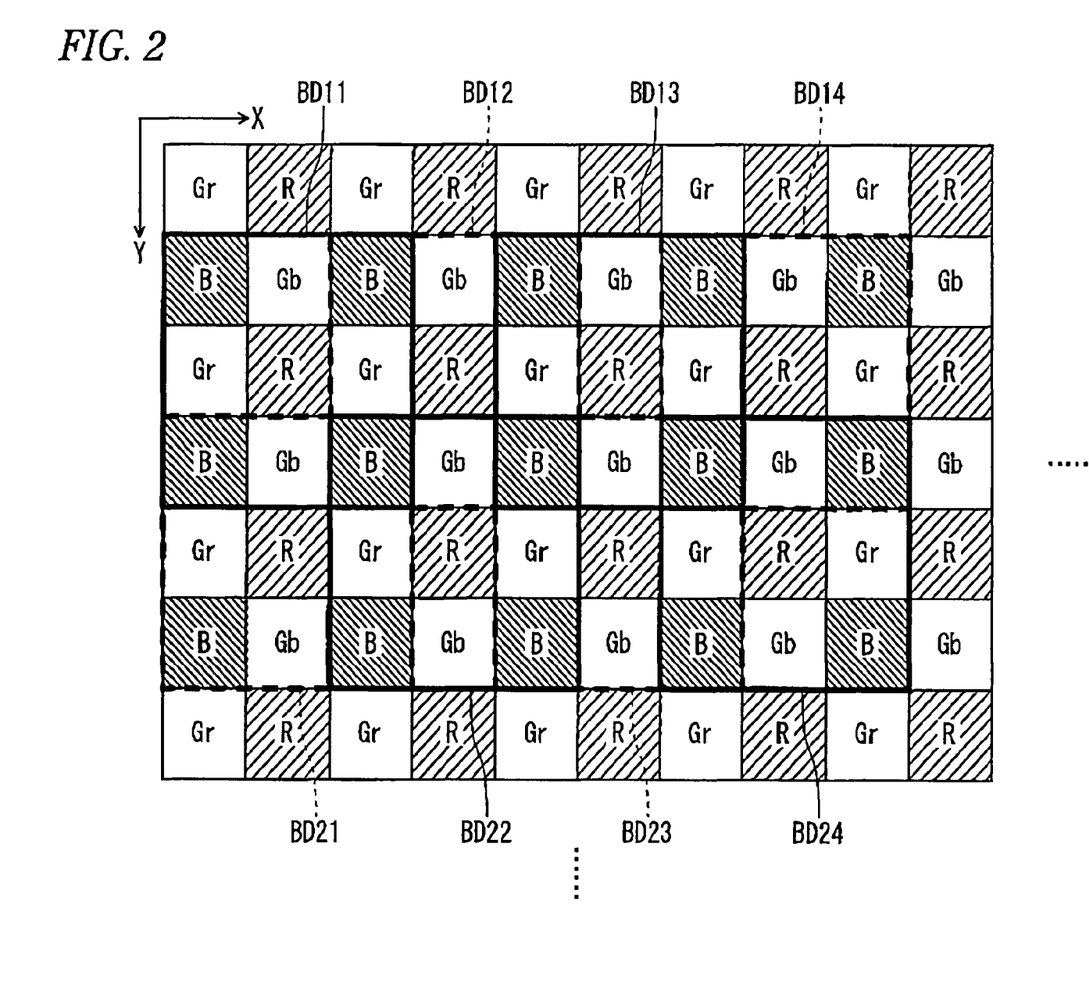
FIG. 2 illustrates the way in which Bayer pattern array RAW data is split into 3×3 pixel block data in the first embodiment and the third embodiment.

Explanation now follows regarding the 3×3 pixel block data pixel configuration. FIG. 2 illustrates the way in which Bayer pattern array RAW data is split into 3×3 pixel block data in the present embodiment. As shown in FIG. 2, the block data acquisition section 23a of the demosaicing processing section 23 reads 3×3 pixel block data from the RAW data stored in the captured image data storage section 22, in the sequence block data BD 11, BD 12, BD 13, BD 14 and so on. After reading along the X direction up to the top right corner of the image, the block data acquisition section 23a then reads 3×3 pixel block data from the RAW data in the sequence block data BD 21, BD 22, BD 23, BD 24 and so on. The block data acquisition section 23a performs demosaicing processing while reading 3×3 pixel block data from the RAW data in such a sequence.

Figure 3:
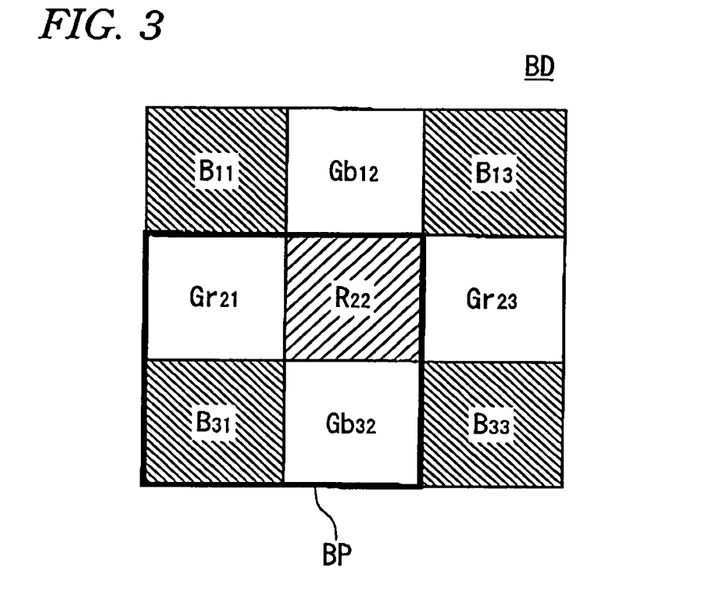
FIG. 3 illustrates 3×3 pixel block data pixel configuration in the first embodiment and the third embodiment.

FIG. 3 illustrates 3×3 pixel block data pixel configuration. As shown in FIG. 3, the block data BD includes a red pixel $R_{22}$, blue pixels $B_{11}, B_{13}, B_{31}, B_{33}$, and green pixels $Gb_{12}, Gb_{32}, Gr_{21}, Gr_{23}$. The numerical suffixes appended to each of the symbols representing each of the pixels express the position of the respective pixels. The block data BD contains a single 2×2 pixel base pixel pattern BP. The base pixel pattern BP contains, for example, top-left pixel $Gr_{21}$, top-right pixel $R_{22}$, bottom-left pixel $B_{31}$ at the bottom left and bottom-right pixel $Gb_{32}$. Namely, the base pixel pattern BP contains the pixel $R_{22}$ at the center of the block data BD.

In the present embodiment, the demosaicing processing section 23 estimates a direction of a contrast boundary using the 4 individual blue pixels $B_{11}, B_{13}, B_{31}, B_{33}$ contained in the block data BD, and computes a blue value corresponding to pixel $R_{22}$ of the base pixel pattern BP based on the pixels $B_{11}, B_{13}, B_{31}, B_{33}$ according to the estimated contrast boundary direction. The computed blue value is used as the blue value of resolution degradation demosaicing processing.

Figure 4:
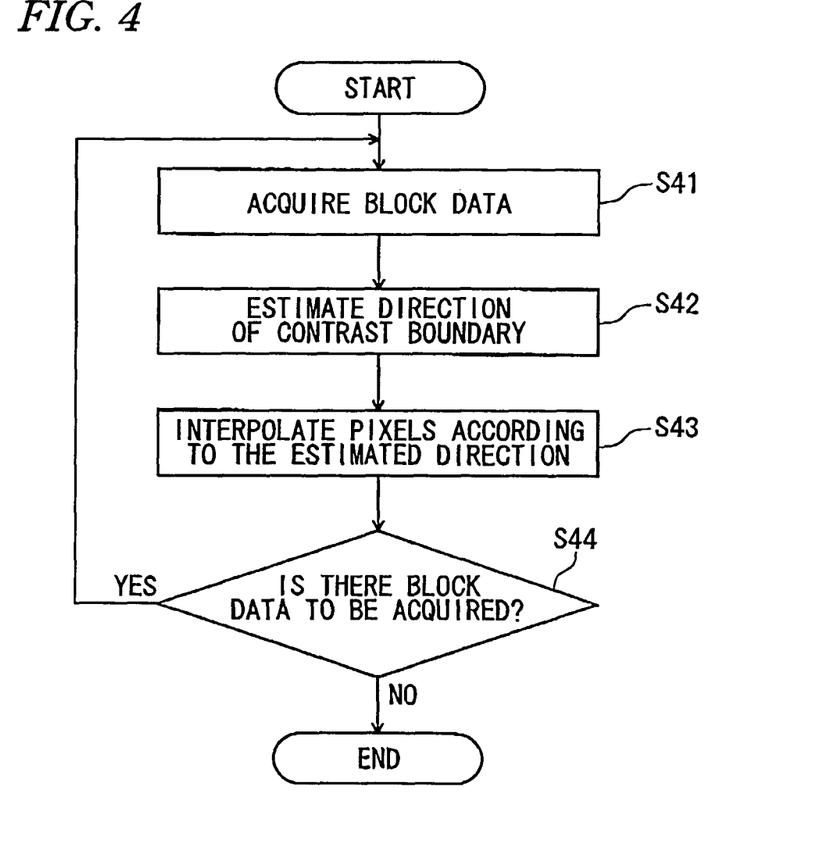
FIG. 4 illustrates a processing sequence of a demosaicing processing section in the first embodiment to the fourth embodiment.

Explanation now follows regarding operation of the demosaicing processing section 23 according to the present embodiment. FIG. 4 illustrates the processing sequence of the demosaicing processing section 23. When at least 3 lines worth of RAW data has been stored in the captured image data storage section 22, the demosaicing processing section 23 starts the processing illustrated in FIG. 4.

At step S41, the block data acquisition section 23a of the demosaicing processing section 23 reads a single individual block data BD from the RAW data stored in the captured image data storage section 22.

At step S42, the contrast boundary estimation section 23b estimates the contrast boundary direction using the 4 individual blue pixels $B_{11}, B_{13}, B_{31}, B_{33}$ contained in the read block data BD.

Specifically, the contrast boundary estimation section 23b computes a blue difference value $\Delta B_{RD}$ between the pixel $B_{11}$ and the pixel $B_{33}$, and a blue difference value $\Delta B_{LD}$ between pixel $B_{13}$ and pixel $B_{31}$, according Equation (1) and Equation (2)

$$\Delta B_{RD} = |B_{11} - B_{33}| \quad \text{Equation (1)}$$

$$\Delta B_{LD} = |B_{13} - B_{31}| \quad \text{Equation (2)}$$

The contrast boundary estimation section 23b then compares the difference value $\Delta B_{RD}$ and the difference value $\Delta B_{LD}$, and the contrast boundary direction in the block data BD is estimated to be along the direction sloping down to the left when determined that the difference value $\Delta B_{RD}$ is greater than the difference value $\Delta B_{LD}$, the contrast boundary direction of the block data BD is estimated to be along the direction sloping down to the right when determined that the difference value $\Delta B_{RD}$ is less than the difference value $\Delta B_{LD}$, and there is estimated to be no contrast boundary direction in the block data BD when the difference value $\Delta B_{RD}$ is equivalent to the difference value $\Delta B_{LD}$.

At step S43, the pixel interpolation processing section 23c computes the blue value $B_{22}$(hat) of the pixel $R_{22}$ of the base pixel pattern BP based on the pixels $B_{11}, B_{13}, B_{31}, B_{33}$ according to the estimation result of the contrast boundary estimation section 23b, and the green value $G_{22}$(hat) of the pixel $R_{22}$ based on the pixel $Gr_{21}$ and the pixel $Gb_{32}$ of the base pixel pattern BP. Note that "(hat)" indicates that preceding value is an estimated value.

Specifically, when the pixel interpolation processing section 23c has estimated the contrast boundary direction is sloping down to the left then the blue value $B_{22}$(hat) of the pixel $R_{22}$ is computed according to Equation (3), when the contrast boundary direction is estimated to be sloping down to the right then the blue value $B_{22}$(hat) of the pixel $R_{22}$ is computed according to Equation (4), and when there is no contrast boundary direction estimated then the blue value $B_{22}$(hat) of the pixel $R_{22}$ is computed according to Equation (5).

$$\hat{B}_{22} = \frac{B_{13} + B_{31}}{2} \quad \text{Equation (3)}$$

$$\hat{B}_{22} = \frac{B_{11} + B_{33}}{2} \quad \text{Equation (4)}$$

$$\hat{B}_{22} = \frac{B_{11} + B_{13} + B_{31} + B_{33}}{4} \quad \text{Equation (5)}$$

The pixel interpolation processing section 23c computes the green value $G_{22}$(hat) of the pixel $R_{22}$ according to Equation (6).

$$\hat{G}_{22} = \frac{Gr_{21} + Gb_{32}}{2} \quad \text{Equation (6)}$$

The pixel interpolation processing section 23c stores the red value of the pixel $R_{22}$, the computed blue value $B_{22}$(hat) of the pixel $R_{22}$, and the computed green value $G_{22}$(hat) of the pixel $R_{22}$ in the color image data storage section 24 as the pixel values after resolution degradation demosaicing.

At step S44, the demosaicing processing section 23 determines whether or not another block data BD exists for processing next in the RAW data being processed. When determined that there is another block data BD for processing (S44: YES), processing proceeds to step S41, however the processing is ended when determined that no further block data BD for processing exists (S44:NO).

For pixels in the RAW data not contained in the 3×3 pixel block data BD (for example, the RAW data frame edge portions), as shown in FIG. 2, color image data for pixels CP are derived from the base pixel patterns BP by resolution degradation demosaicing processing of a related-art technique, as shown in FIGS. 7A and 7B.

That is, the pixel R value and the pixel B value of the base pixel pattern BP are taken as the red value and the blue value of the pixel CP, respectively, and the average value of the pixel Gr and the pixel Gb of the base pixel pattern BP is taken as the green value of the pixel CP.

As explained above, in the present embodiment, the demosaicing processing section 23 does not apply the blue value from the pixel $B_{31}$ of the base pixel pattern BP as the blue value for the pixel $R_{22}$ of the base pixel pattern BP. Rather, the demosaicing processing section 23 estimates the contrast boundary direction of the image based on the blue pixels $B_{11}$, $B_{13}$, $B_{31}$, $B_{33}$ in the 3×3 pixel block data BD containing the base pixel pattern BP. Consequently, according to the demosaicing processing section 23 of the present embodiment, false yellow coloring at the contrast boundary portions of the image can be suppressed from occurring. Namely, since the demosaicing processing section 23 has a tendency to compute a lower blue value at the pixel $R_{22}$ of the base pixel pattern BP, this shifts in the blue-green color system at the contrast boundary portions where false color readily occurs for the color pixel data as a whole.

Consequently, in the image recognition apparatus of the present embodiment, since false yellow coloring does not readily occur in the color image data from resolution degradation demosaicing processing the Bayer pattern array RAW data with reduced frame size, false detection of lane markings can be suppressed while maintaining a high detection precision of lane markings with the image recognition processing section 25.

Second Embodiment

A second embodiment differs in the processing of the demosaicing processing section 23 from that of the image recognition system 1 of the first embodiment. The demosaicing processing section 23 of the present embodiment will be mainly explained. Since the functional configuration of the demosaicing processing section 23 is similar to that of the first embodiment, further explanation thereof will be omitted.

Figure 5:
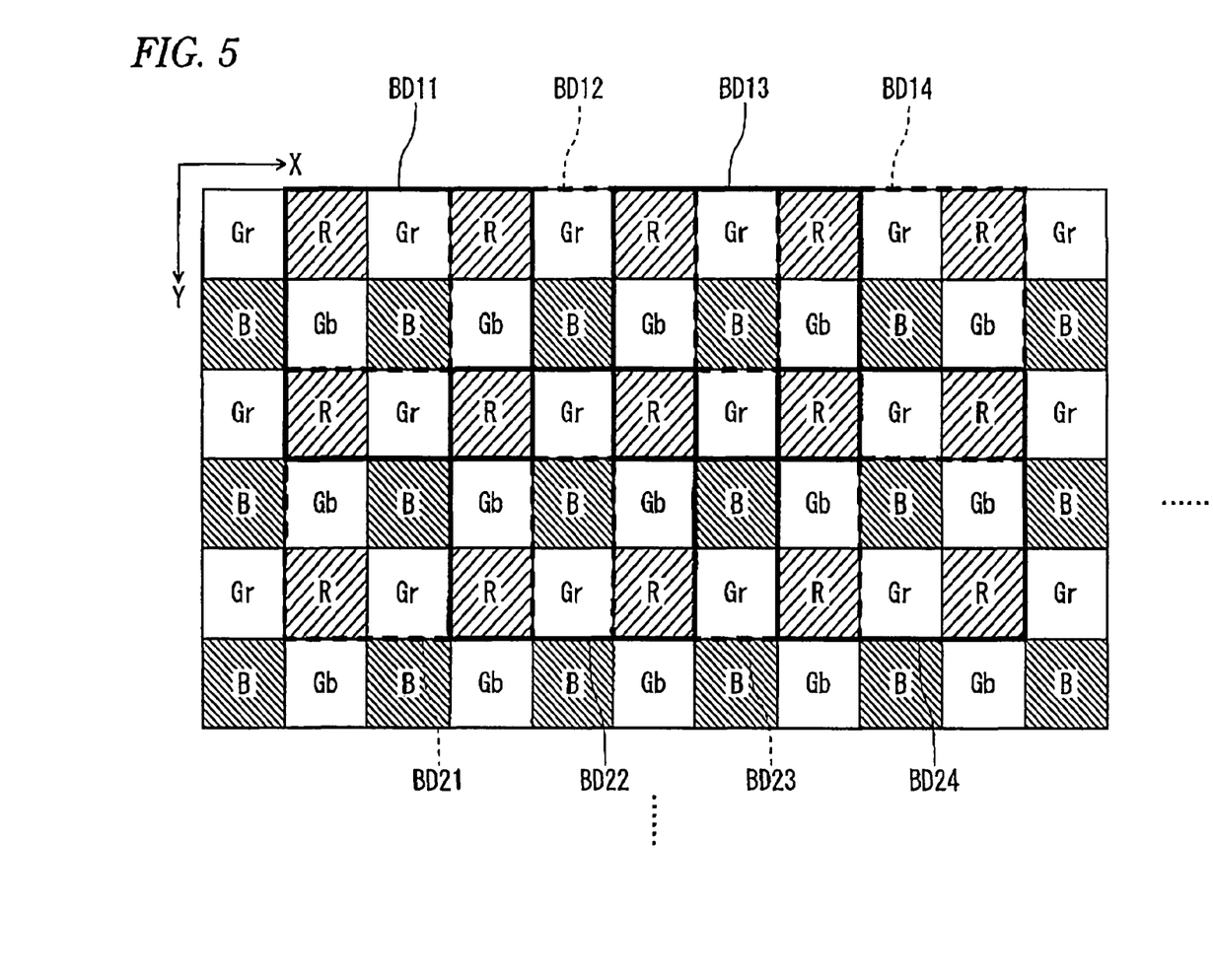
FIG. 5 illustrates the way in which Bayer pattern array RAW data is split into 3×3 pixel block data in the second embodiment and the fourth embodiment.

FIG. 5 illustrates the way in which Bayer pattern array RAW data is split into 3×3 pixel block data in the present embodiment. As shown in FIG. 5, the block data acquisition section 23a of the demosaicing processing section 23 reads 3×3 pixel block data from the RAW data stored in the captured image data storage section 22, in the sequence block data BD 11, BD 12, BD 13, BD 14 and so on. After reading along the X direction up to the top right corner of the image, the block data acquisition section 23a then reads 3×3 pixel block data from the RAW data in the sequence block data BD 21, BD 22, BD 23, BD 24 and so on. The block data acquisition section 23a performs demosaicing processing while reading 3×3 pixel block data from the RAW data in such a sequence.

Figure 6:
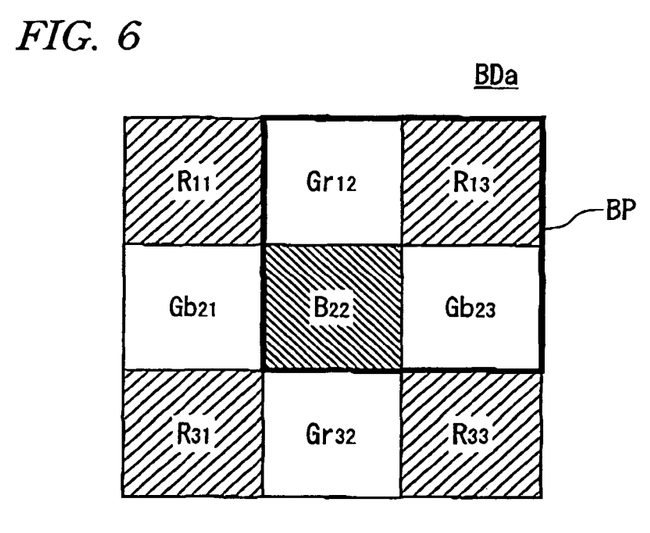
FIG. 6 illustrates 3×3 pixel block data pixel configuration in the second embodiment and the fourth embodiment.

FIG. 6 illustrates 3×3 pixel block data pixel configuration. As shown in FIG. 6, the block data BDa includes a blue pixel $B_{22}$, red pixels $R_{11}$, $R_{13}$, $R_{31}$, $R_{33}$, and green pixels $Gr_{12}$, $Gb_{21}$, $Gb_{23}$, $Gr_{32}$. The numerical suffixes appended to each of the symbols representing each of the pixels express the position of the respective pixels. The block data BDa includes a single 2×2 pixel base pixel pattern BP. The base pixel pattern BP contains, for example, top-left pixel $Gr_{12}$, top-right pixel $R_{13}$, bottom-left pixel $B_{22}$ and bottom-right pixel $Gb_{23}$. Namely, the base pixel pattern BP contains the pixel $B_{22}$ at the center of the block data BDa.

In the present embodiment, the demosaicing processing section 23 estimates a direction of a contrast boundary using the 4 individual red pixels $R_{11}$, $R_{13}$, $R_{31}$, $R_{33}$ contained in the block data BDa, and computes a red value corresponding to pixel $B_{22}$ of the base pixel pattern BP based on the red pixels $R_{11}$, $R_{13}$, $R_{31}$, $R_{33}$ according to the estimated contrast boundary direction. The computed red value is used as the red value of resolution degradation demosaicing processing.

Explanation now follows regarding operation of the demosaicing processing section 23 according to the present embodiment. Since the processing sequence of the demosaicing processing section 23 is the same as illustrated in FIG. 4, explanation is based on the same figure. When at least 3 lines worth of RAW data has been stored in the captured image data storage section 22, the demosaicing processing section 23 starts the processing illustrated in FIG. 4.

At step S41, the block data acquisition section 23a of the demosaicing processing section 23 reads a single individual block data BDa from the RAW data stored in the captured image data storage section 22.

At step S42, the contrast boundary estimation section 23b estimates the contrast boundary direction using the 4 individual red pixels $R_{11}$, $R_{13}$, $R_{31}$, $R_{33}$ contained in the read block data BDa.

Specifically, the contrast boundary estimation section 23b computes a red difference value $\Delta R_{RD}$ between the pixel $R_{11}$ and the pixel $R_{33}$, and a red difference value $\Delta R_{LD}$ between pixel $R_{13}$ and pixel $R_{31}$, according to Equation (7) and Equation (8).

$$\Delta R_{RD} = |R_{11} - R_{33}| \qquad \text{Equation (7)}$$

$$\Delta R_{LD} = |R_{13} - R_{31}| \qquad \text{Equation (8)}$$

The contrast boundary estimation section 23b then compares the difference value $\Delta R_{RD}$ and the difference value $\Delta R_{LD}$, and the contrast boundary direction in the block data BDa is estimated to be along the direction sloping down to the left when determined that the difference value $\Delta R_{RD}$ is greater than the difference value $\Delta R_{LD}$, the contrast boundary direction of the block data BDa is estimated to be along the direction sloping down to the right when determined that the difference value $\Delta R_{RD}$ is less than the difference value $\Delta R_{LD}$, and there is estimated to be no contrast boundary direction in the block data BDa when the difference value $\Delta R_{RD}$ is equivalent to the difference value $\Delta R_{LD}$.

At step S43, the pixel interpolation processing section 23c computes the red value $R_{22}$ (hat) of the pixel $B_{22}$ of the base pixel pattern BP based on the pixels $R_{11}$, $R_{13}$, $R_{31}$, $R_{33}$ according to the estimation result of the contrast boundary estimation section 23b, and the green value $G_{22}$ (hat) of the pixel $B_{22}$ based on the pixel $Gr_{12}$ and the pixel $Gb_{23}$ of the base pixel pattern BP.

Specifically, when the pixel interpolation processing section 23c has estimated the contrast boundary direction is sloping down to the left then the red value $R_{22}$(hat) of the pixel $B_{22}$ is computed according to Equation (9), when the contrast boundary direction is estimated to be sloping down to the right then the red value $R_{22}$(hat) of the pixel $B_{22}$ is computed according to Equation (10), and when there is no contrast boundary direction estimated then the red value $R_{22}$(hat) of the pixel $B_{22}$ is computed according to Equation (11).

$$\hat{R}_{22} = \frac{R_{13} + R_{31}}{2} \qquad \text{Equation (9)}$$

$$\hat{R}_{22} = \frac{R_{11} + R_{33}}{2} \qquad \text{Equation (10)}$$

$$\hat{R}_{22} = \frac{R_{11} + R_{13} + R_{31} + R_{33}}{4} \qquad \text{Equation (11)}$$

The pixel interpolation processing section 23c computes the green value $G_{22}$(hat) of the pixel $B_{22}$ according to Equation (12).

$$\hat{G}_{22} = \frac{Gr_{12} + Gb_{23}}{2} \qquad \text{Equation (12)}$$

The pixel interpolation processing section 23c stores the red value of the pixel $B_{22}$, the computed red value $R_{22}$(hat) of the pixel $B_{22}$, and the computed green value $G_{22}$(hat) of the pixel $B_{22}$ in the color image data storage section 24 as the pixel values after resolution degradation demosaicing.

At step S99, the demosaicing processing section 23 determines whether or not another block data BDa exists for processing next in the RAW data being processed. When determined that there is another block data BDa for processing (S44: YES), processing proceeds to step S41, however the processing is ended when determined that no further block data BDa for processing exists (S44:NO).

Note that, as shown in FIG. 5, for pixels in the RAW data not contained in the 3×3 pixel block data BDa (for example, the RAW data frame edge portions), color image data for pixels CP are derived from the base pixel pattern BP by resolution degradation demosaicing processing of a related-art technique, as shown in FIGS. 7A and 7B.

That is, the pixel R value and pixel B value of the base pixel pattern BP are taken as the red value and the blue value of the pixel CP, respectively, and the average of the pixel Gr value and the pixel Gb value of the base pixel pattern BP is taken as the green value of the pixel CP.

As explained above, in the present embodiment, the demosaicing processing section 23 does not apply the red value from the pixel $R_{13}$ of the base pixel pattern BP as the red value for the pixel $B_{22}$ of the base pixel pattern BP, but instead estimates the contrast boundary direction of the image based on the red pixels $R_{11}$, $R_{13}$, $R_{31}$, $R_{33}$ in the 3×3 pixel block data BDa containing the base pixel pattern BP. Consequently, according to the demosaicing processing section 23 of the present embodiment, false yellow coloring at the contrast boundary portions of the image can be suppressed from occurring. Namely, since the demosaicing processing section 23 tends to compute a lower red value at the pixel $B_{22}$ of the base pixel pattern BP, this shifts in the red-yellow color system at the contrast boundary portions where false color readily occurs for the color pixel data as a whole.

Consequently, in the image recognition apparatus of the present embodiment, since false yellow coloring does not readily occur in the color image data from resolution degradation demosaicing processing the Bayer pattern array RAW data with reduced frame size, false detection of lane markings can be suppressed while maintaining a high detection precision of lane markings with the image recognition processing section 25.

Third Embodiment

A third embodiment differs in the processing of the demosaicing processing section 23 from that of the image recognition system 1 of the first embodiment. In the first embodiment, the pixel interpolation processing section 23c of the demosaicing processing section 23 computes the green value $G_{22}$(hat) of the pixel $R_{22}$ according to Equation (6). Namely, in the first embodiment, the pixel interpolation processing section 23c takes the average value of pixel $Gr_{21}$ and pixel $Gb_{32}$ as the green value $G_{22}$(hat) of the pixel $R_{22}$.

However, in the present embodiment, the contrast boundary estimation section 23b estimates the contrast boundary direction using the 4 individual green pixels $Gb_{12}$, $Gb_{32}$, $Gr_{21}$, $Gr_{23}$ contained in the block data BD. The green value $G_{22}$(hat) of the pixel $R_{22}$ of the base pixel pattern BP is then computed based on the pixels $Gr_{21}$, $Gb_{32}$ according to the estimated contrast boundary direction. This computed green value $G_{22}$(hat) is then used for the green value of resolution degradation demosaicing.

The demosaicing processing section 23 of the present embodiment will be mainly explained. Since the functional configuration of the demosaicing processing section 23 is similar to that of the first embodiment, further explanation thereof will be omitted.

Explanation now follows regarding operation of the demosaicing processing section 23 according to the present embodiment. Since the processing sequence of the demosaicing processing section 23 is the same as illustrated in FIG. 4, explanation is based on the same figure. Processing steps that are the same as processing in the first embodiment will be omitted, and explanation only given of the steps with different processing.

At step S42, the contrast boundary estimation section 23b estimates a first contrast boundary direction using the 4 individual blue pixels $B_{11}$, $B_{13}$, $B_{31}$, $B_{33}$ contained in the block data BD that has been read, and subsequently estimates a second contrast boundary direction using the 4 individual green pixels $Gb_{12}$, $Gb_{32}$, $Gr_{21}$, $Gr_{23}$.

Specifically, estimation of the first contrast boundary direction is performed using the estimation method of the contrast boundary direction by computation according to Equation (1) and Equation (2) of the first embodiment.

Estimation of the second contrast boundary direction is as follows. The contrast boundary estimation section 23b computes a green difference value $\Delta G_V$ between the pixel $Gb_{12}$ and the pixel $Gb_{32}$ and a green difference value $\Delta G_H$ between the pixel $Gr_{21}$ and the pixel $Gr_{23}$ according to Equation (13) and Equation (14).

$$\Delta G_V = |Gr_{12} - Gr_{32}| \qquad \text{Equation (13)}$$

$$\Delta G_H = |Gb_{21} - Gb_{23}| \qquad \text{Equation (14)}$$

The contrast boundary estimation section 23b then compares the difference value $\Delta G_V$ and the difference value $\Delta G_H$, and the second contrast boundary direction in the block data BD is estimated to be in the horizontal direction when determined that the difference value $\Delta G_V$ is greater than the difference value $\Delta G_H$, the second contrast boundary direction of the block data BD is estimated to be in the vertical direction when determined that the difference value $\Delta G_V$ is less than the difference value $\Delta G_H$, and there is estimated to be no second contrast boundary direction in the block data BD when the difference value $\Delta G_V$ is equivalent to the difference value $\Delta G_H$.

At step S43, the pixel interpolation processing section 23c computes the blue value $B_{22}$(hat) of the pixel $R_{22}$ of the base pixel pattern BP based on the pixels $B_{11}$, $B_{13}$, $B_{31}$, $B_{33}$ according to the estimation result of the first contrast boundary direction by the contrast boundary estimation section 23b, and subsequently computes the green value $G_{22}$(hat) of the pixel $R_{22}$ based on the pixels $Gr_{21}$, $Gb_{32}$ according to the estimation result of the second contrast boundary direction by the contrast boundary estimation section 23b.

Specifically, computation of the blue value $B_{22}$(hat) of the pixel $R_{22}$ is the same as the computation in the first embodiment.

Computation of the green value $G_{22}$(hat) of the pixel $R_{22}$ is as follows. The pixel interpolation processing section 23c applies the green pixel $Gr_{21}$ of the base pixel pattern BP as the green value $G_{22}$(hat) of the pixel $R_{22}$ when the second contrast boundary direction is estimated to be in the horizontal direction, and applies the green pixel $Gb_{32}$ of the base pixel pattern BP as the green value $G_{22}$(hat) of the pixel $R_{22}$ when the second contrast boundary direction is estimated to be in the vertical direction. When there is estimated to be no second contrast boundary direction then the green value $G_{22}$(hat) of the pixel $R_{22}$ is computed according to above Equation (6).

The pixel interpolation processing section 23c stores the red value of the pixel $R_{22}$, the computed blue value $B_{22}$(hat) of the pixel $R_{22}$, and the computed green value $G_{22}$(hat) of the pixel $R_{22}$ in the color image data storage section 24 as the pixel values after resolution degradation demosaicing.

As explained above, in the present embodiment, in addition to the processing of the first embodiment, the demosaicing processing section 23 does not take the average value of the pixel $Gr_{21}$ and pixel $Gb_{32}$ of the base pixel pattern BP as the green value of the pixel $R_{22}$ of the base pixel pattern BP, but instead estimates the contrast boundary direction of the image based on the green pixels $Gb_{12}$, $Gb_{32}$, $Gr_{21}$, $Gr_{23}$ in the 3×3 pixel block data BD containing the base pixel pattern BP. Consequently, according to the demosaicing processing section 23 of the present embodiment, false yellow coloring at the contrast boundary portions of the image can be even more efficiently suppressed from occurring than in the first embodiment.

Consequently, in the image recognition apparatus of the present embodiment, since false yellow coloring does not readily occur in the color image data from resolution degradation demosaicing processing the Bayer pattern array RAW data with reduced frame size, false-positive detection of lane markings can be suppressed while maintaining a high detection precision of lane markings with the image recognition processing section 25.

Modification of Third Embodiment

In the above third embodiment the pixel interpolation processing section 23c of the demosaicing processing section 23 computes the green value $G_{22}$(hat) of the pixel $R_{22}$ based on the pixels $Gr_{21}$, $Gb_{23}$ according to the estimation result of the second contrast boundary direction by the contrast boundary estimation section 23b.

However, in this modification, the contrast boundary estimation section 23b estimates a contrast boundary direction using the 4 individual green pixels $Gb_{12}$, $Gb_{32}$, $Gr_{21}$, $Gr_{23}$ contained in the block data BD. The green value $G_{22}$(hat) of the pixel $R_{22}$ of the base pixel pattern BP is then computed based on the pixels $Gb_{12}$, $Gb_{32}$, $Gr_{21}$, $Gr_{23}$ according to the estimated contrast boundary direction, and this computed green value $G_{22}$(hat) is employed as the green value in the resolution degradation demosaicing. Only the elements of the present modification that differ from the third embodiment will be explained.

In this modification, the computation sequence of step S43 differs from the processing sequence of the demosaicing processing section 23 in the third embodiment. Namely, at step S43, the pixel interpolation processing section 23c computes the blue value $B_{22}$(hat) of the pixel $R_{22}$ of the base pixel pattern BP based on the pixels $B_{11}$, $B_{13}$, $B_{31}$, $B_{33}$ according to the estimation result of the first contrast boundary direction by the contrast boundary estimation section 23b. The pixel interpolation processing section 23c then computes the green value $G_{22}$(hat) of the pixel $R_{22}$ based on the pixels $Gb_{12}$, $Gb_{32}$, $Gr_{21}$, $Gr_{23}$ according to the estimation result of the second contrast boundary direction by the contrast boundary estimation section 23b.

Specifically, computation of the green value $G_{22}$(hat) of the pixel $R_{22}$ is as follows. The pixel interpolation processing section 23c computes the green value $G_{22}$(hat) of the pixel $R_{22}$ according to Equation (15) when the second contrast boundary direction is estimated to be in the horizontal direction, and computes the green value $G_{22}$(hat) of the pixel $R_{22}$ according to Equation (16) when the second contrast boundary direction is estimated to be in the vertical direction. When there is estimated to be no second contrast boundary the green value $G_{22}$(hat) of the pixel $R_{22}$ is estimated according to Equation (17).

$$\hat{G}_{22} = \frac{3 \times Gr_{21} + Gr_{23}}{4} \qquad \text{Equation (15)}$$

$$\hat{G}_{22} = \frac{Gb_{12} + 3 \times Gb_{32}}{4} \qquad \text{Equation (16)}$$

$$\hat{G}_{22} = \frac{Gb_{12} + 3 \times Gr_{21} + Gr_{23} + 3 \times Gb_{32}}{8} \qquad \text{Equation (17)}$$

The pixel interpolation processing section 23c then stores the red value of the pixel $R_{22}$, the computed blue value $B_{22}$(hat) of the pixel $R_{22}$, and the computed green value $G_{22}$(hat) of the pixel $R_{22}$ in the color image data storage section 24 as pixel values after resolution degradation demosaicing.

As explained above, in the modification, the demosaicing processing section 23, in addition to the processing of the first embodiment, estimates the contrast boundary direction of the image based on the green pixels $Gb_{12}$, $Gb_{32}$, $Gr_{21}$, $Gr_{23}$ in the 3×3 pixel block data BD containing the base pixel pattern BP. For the green value of the pixel $R_{22}$ of the base pixel pattern BP the demosaicing processing section 23 then determines weightings to be applied to the two green pixels present in the estimated direction. Consequently, according to the demosaicing processing section 23 of the present embodiment, not only can false yellow coloring at the contrast boundary portions of the image be efficiently suppressed from occurring, but high color reproducibility can also be preserved in the color image data.

Fourth Embodiment

The fourth embodiment differs in the processing of the demosaicing processing section 23 from that of the image recognition system 1 of the second embodiment. In the second embodiment, the pixel interpolation processing section 23c of the demosaicing processing section 23 computes the green value $G_{22}$(hat) of the pixel $B_{22}$ according to the Equation (12). Namely, in the second embodiment, the pixel interpolation processing section 23c takes the average value of the pixel $Gr_{12}$ and the pixel $Gb_{23}$ as the green value $G_{22}$(hat) of the pixel $B_{22}$.

However, in the present embodiment, the contrast boundary estimation section 23b estimates the contrast boundary direction using the 4 individual green pixels $Gr_{12}$, $Gb_{21}$, $Gb_{23}$, $Gr_{32}$ in the block data BDa, and the green value $G_{22}$(hat) of the pixel $B_{22}$ of the base pixel pattern BP is then computed based on the pixels $Gr_{12}$, $Gb_{23}$ according to the estimated contrast boundary direction. This computed green value $G_{22}$(hat) is then employed as the green value of resolution degradation demosaicing. The demosaicing processing section 23 of the present embodiment will be mainly explained. Since the functional configuration of the demosaicing processing section 23 is similar to that of the first embodiment, further explanation thereof will be omitted.

Explanation now follows regarding operation of the demosaicing processing section 23 according to the present embodiment. Since the processing sequence of the demosaicing processing section 23 is the same as illustrated in FIG. 4, explanation is based on the same figure. Processing steps that are the same as processing in the first embodiment will be omitted, and explanation only given of the steps with different processing.

At step S42, the contrast boundary estimation section 23b estimates a first contrast boundary direction using the 4 individual red pixels $R_{11}$, $R_{13}$, $R_{31}$, $R_{33}$ contained in the block data BDa that has been read, then estimates a second contrast boundary direction using the 4 individual green pixels $Gr_{12}$, $Gb_{21}$, $Gb_{23}$, $Gr_{32}$.

Specifically, estimation of the first contrast boundary direction is performed using the estimation method of the contrast boundary direction by computation according to Equation (7) and Equation (8) of the second embodiment.

Estimation of the second contrast boundary direction is performed as follows. The contrast boundary estimation section 23b computes a green difference value $\Delta G_V$ between the pixel $Gr_{12}$ and the pixel $Gr_{32}$ and a green difference value $\Delta G_H$ between the pixel $Gb_{21}$ and the pixel $Gb_{23}$ according to Equation (18) and Equation (19).

$$\Delta G_V = |Gr_{12} - Gr_{32}| \quad \text{Equation (18)}$$

$$\Delta G_H = |Gb_{21} - Gb_{23}| \quad \text{Equation (19)}$$

The contrast boundary estimation section 23b then compares the difference value $\Delta G_V$ and the difference value $\Delta G_H$, and the second contrast boundary direction in the block data BDa is estimated to be in the horizontal direction when determined that the difference value $\Delta G_V$ is greater than the difference value $\Delta G_H$, the second contrast boundary direction of the block data BDa is estimated to be in the vertical direction when determined that the difference value $\Delta G_V$ is less than the difference value $\Delta G_H$, and there is estimated to be no second contrast boundary direction in the block data BDa when the difference value $\Delta G_V$ is equivalent to the difference value $\Delta G_H$.

At step S43, the pixel interpolation processing section 23c computes the red value $R_{22}$(hat) of the pixel $B_{22}$ of the base pixel pattern BP based on the pixels $R_{11}$, $R_{13}$, $R_{31}$, $R_{33}$ according to the estimation result of the first contrast boundary direction by the contrast boundary estimation section 23b, and then computes the green value $G_{22}$(hat) of the pixel $B_{22}$ based on the pixels $Gr_{12}$, $Gb_{23}$ according to the estimation result of the second contrast boundary direction by the contrast boundary estimation section 23b.

Specifically, computation of the red value $R_{22}$(hat) of the pixel $B_{22}$ is the same as the computation in the second embodiment.

Computation of the green value $G_{22}$(hat) of the pixel $B_{22}$ is performed as follows. The pixel interpolation processing section 23c applies the green pixel $Gb_{23}$ of the base pixel pattern BP as the green value $G_{22}$(hat) of the pixel $B_{22}$ when the second contrast boundary direction is estimated to be in the horizontal direction. The pixel interpolation processing section 23c applies the green pixel $Gr_{12}$ of the base pixel pattern BP as the green value $G_{22}$(hat) of the pixel $B_{22}$ when the second contrast boundary direction is estimated to be in the vertical direction. When there is estimated to be no second contrast boundary direction then the green value $G_2$(hat) of the pixel $B_{22}$ is computed according to above Equation (12).

The pixel interpolation processing section 23c stores the blue value $B_{22}$(hat) of the pixel $B_{22}$, the computed red value $R_{22}$(hat) of the pixel $B_{22}$, and the computed green value $G_{22}$(hat) of the pixel $B_{22}$ in the color image data storage section 24 as the pixel values after resolution degradation demosaicing.

As explained above, in the present embodiment, the demosaicing processing section 23, in addition to the processing of the second embodiment, does not take the average value of the pixel $Gr_{12}$ and pixel $Gb_{23}$ of the base pixel pattern BP as the green value of the pixel $B_{22}$ of the base pixel pattern BP, but instead estimates the contrast boundary direction of the image based on the green pixels $Gr_{12}$, $Gb_{21}$, $Gb_{23}$, $Gr_{32}$ in the 3×3 pixel block data BDa containing the base pixel pattern BP, and determines the value accordingly. Consequently, according to the demosaicing processing section 23 of the present embodiment, false yellow coloring at the contrast boundary portions of the image can be even more efficiently suppressed from occurring than in the second embodiment.

Consequently, in the image recognition apparatus of the present embodiment, since false yellow coloring does not readily occur in the color image data from resolution degradation demosaicing processing the Bayer pattern array RAW data with reduced frame size, false-positive detection of lane markings can be suppressed while maintaining a high detection precision of lane markings with the image recognition processing section 25.

Modification of Fourth Embodiment

In the above fourth embodiment the pixel interpolation processing section 23c of the demosaicing processing section 23 computed the green value $G_{22}$(hat) of the pixel $B_{22}$ based on the pixels $Gr_{12}$, $Gb_{23}$ according to the estimation result of the second contrast boundary direction by the contrast boundary estimation section 23b.

However, in this modification, the contrast boundary estimation section 23b estimates the contrast boundary direction using the 4 individual green pixels $Gr_{12}$, $Gb_{21}$, $Gb_{23}$, $Gr_{32}$ contained in the block data BDa. The green value $G_{22}$(hat) of the pixel $B_{22}$ of the base pixel pattern BP is then computed based on the pixels $Gr_{12}$, $Gb_{21}$, $Gb_{23}$, $Gr_{32}$ according to the estimated contrast boundary direction, and this computed green value $G_{22}$(hat) is employed as the green value of the resolution degradation demosaicing. Only the elements of the present modification that differ from the fourth embodiment will be explained.

In this modification, the computation sequence of step S43 differs from the processing sequence of the demosaicing processing section 23 in the fourth embodiment. Namely, at step S43, the pixel interpolation processing section 23c computes the red value $R_{22}$(hat) of the pixel $B_{22}$ of the base pixel pattern BP based on the pixels $R_{11}$, $R_{13}$, $R_{31}$, $R_{33}$ according to the estimation result of the first contrast boundary direction by the contrast boundary estimation section 23b. The pixel interpolation processing section 23c then computes the green value $G_{22}$(hat) of the pixel $B_{22}$ based on the pixels $Gr_{12}$, $Gb_{21}$, $Gb_{23}$, $Gr_{32}$ according to the estimation result of the second contrast boundary direction by the contrast boundary estimation section 23b.

Specifically, computation of the green value $G_{22}$(hat) of the pixel $B_{22}$ is as follows. The pixel interpolation processing section 23c computes the green value $G_{22}$(hat) of the pixel $B_{22}$ according to Equation (20) when the second contrast boundary direction is estimated to be in the horizontal direction, and computes the green value $G_{22}$(hat) of the pixel $B_{22}$ according to Equation (21) when the second contrast boundary direction is estimated to be in the vertical direction. When there is estimated to be no second contrast boundary the green value $G_{22}$(hat) of the pixel $B_{22}$ is estimated according to Equation (22).

$$\hat{G}_{22} = \frac{Gb_{21} + 3 \times Gb_{23}}{4} \quad \text{Equation (20)}$$

$$\hat{G}_{22} = \frac{3 \times Gr_{12} + Gr_{32}}{4} \quad \text{Equation (21)}$$

$$\hat{G}_{22} = \frac{3 \times Gr_{12} + Gb_{21} + 3 \times Gb_{23} + Gr_{32}}{8} \quad \text{Equation (22)}$$

After resolution degradation demosaicing the pixel interpolation processing section 23c then stores the blue value of the pixel $B_{22}$, the computed red value $R_{22}$(hat) of the pixel $B_{22}$, and the computed green value $G_{22}$(hat) of the pixel $B_{22}$ in the color image data storage section 24 as pixel values after resolution degradation demosaicing.

As explained above, in the present modification, the demosaicing processing section 23, in addition to the processing of the second embodiment, estimates the contrast boundary direction of the image based on the green pixels $Gr_{12}$, $Gb_{21}$, $Gb_{23}$, $Gr_{32}$ in the 3×3 pixel block data BDa containing the base pixel pattern BP, so as to determine weightings to be applied to the two green pixels present in the estimated direction for the green value of the pixel $B_{22}$ of the base pixel pattern BP. Consequently, according to the demosaicing processing section 23 of the present embodiment, not only can false yellow coloring at the contrast boundary portions of the image be efficiently suppressed from occurring, but high color reproducibility can also be preserved in the color image data.

Note that while the image recognition system in each of the above embodiments is configured with an image processing apparatus on the image recognition apparatus side, other configurations may be made, with an image processing apparatus provided on the image capture apparatus side.

In each of the above embodiments a base pixel pattern of 2×2 pixel block BP is employed, either the 2×2 pixel block BP at the bottom left hand side in the 3×3 pixel block data BD shown in FIG. 3, or the 2×2 pixel block BP at the top right hand side in the 3×3 pixel block data BDa shown in FIG. 6. However, the base pixel pattern may be provided at any of the top left hand side, the top right hand side, the bottom left hand side or the bottom right hand side in the block data BD, BDa.

Section (s) of the image processing apparatus in the above embodiments, for example, the function of the demosaicing processing section, may be executed by a computer. In such cases, a demosaicing processing program for executing this processing function may be stored on a computer readable storage medium, and execution achieved by getting a computer system to read and executed the demosaicing processing program stored on the storage medium. Note that reference to "computer system" includes Operating System (OS) and hardware of any peripheral device(s). Reference to "computer readable storage medium" means a portable storage medium such as a floppy disk, magneto-optical disk, optical disk, memory card, or a storage device, such as an internal hard disk in a computer system. Reference to a "computer readable storage medium" includes configurations in which a program is dynamically retained for a short interval of time, such as with a communication line, for example a configuration in which a program is transmitted via a communication line such as a network, like the Internet, or a telecommunication line. In such cases, configuration may include temporary holding of programs, such as in volatile memory in a computer system configured with server and client. Such a program may be for executing portion(s) of the functionality described above, and the above described functionality may be executed in combination with program(s) pre-stored in a computer system.

Detailed description of the embodiments has been given with reference to the drawings, however specific configurations are not limited to these embodiments, and design equivalents not departing from the spirit are included.

The invention claimed is:

1. An image processing apparatus comprising:
a block data acquisition section configured
to receive image data in which rows of alternately disposed blue pixels and green pixels and rows of alternately disposed green pixels and red pixels are alternately disposed along a column direction, and
to acquire 3×3 pixel block data from the image data to have one red pixel positioned at a center, four blue pixels positioned at corners and four green pixels positioned respectively at above/below/left/right portions of the center;
a contrast boundary estimation section configured
to compute blue value differences between blue values of diagonal pairs of the blue pixels in the block data, and
to estimate a direction of a contrast boundary in the block data based on the blue value differences; and
a pixel interpolation processing section configured
to compute a blue value based on the blue values of the four blue pixels within the block date according to the estimated direction of the contrast boundary,
to compute a green value based on green values of two green pixels within a 2×2 pixel pattern contained in the block data, and
to output a color image pixel correspondingly with the pixel pattern to have
(1) a red value of the red pixel,
(2) the computed blue value and
(3) the computed green value.

2. The image processing apparatus of claim 1,
wherein the contrast boundary estimation section computes green value differences between the green values of vertical and horizontal pairs of the green pixels in the block data,
wherein the contrast boundary estimation section estimates a first contrast boundary direction from the blue difference values and a second contrast boundary direction from the green difference values, and
wherein the pixel interpolation processing section computes the computed blue value based on the blue values of the four blue pixels within the block data according to the first contrast boundary direction, and computes the computed green value based on the green values of the two green pixels within the pixel pattern according to the second contrast boundary direction.

3. The image processing apparatus of claim 1,
wherein the contrast boundary estimation section computes green value differences between the green values of vertical and horizontal pairs of the green pixels in the block data,
wherein the contrast boundary estimation section estimates a first contrast boundary direction from the blue difference values and a second contrast boundary direction from the green difference values, and
wherein the pixel interpolation processing section
computes the computed green value based on the green values of the horizontal pair of the green pixels within the 3×3 pixel data block while weighting the green value of the green pixel within the 2×2 pixel pattern when the second contrast boundary direction is estimated to be in a horizontal direction, and
computes the computed green value based on the green values of the vertical pair of the green pixels within the 3×3 pixel data block while weighting the green value of the green pixel within the 2×2 pixel pattern when the second contrast boundary direction is estimated to be in a vertical direction.

4. An image processing apparatus comprising:
a block data acquisition section configured
to receive image data in which rows of alternately disposed blue pixels and green pixels and rows of alternately disposed green pixels and red pixels are alternately disposed along a column direction, and
to acquire 3×3 pixel block data from the image data to have one blue pixel positioned at a center, four red pixels positioned at corners and four green pixels positioned respectively at above/below/left/right portions of the center;
a contrast boundary estimation section configured
to compute red value differences between red values of diagonal pairs of the red pixels in the block data, and
to estimate a direction of a contrast boundary in the block data based on the red value differences; and
a pixel interpolation processing section configured
to compute a red value based on the red values of the four red pixels within the block data according to the estimated direction of the contrast boundary,
to compute a green value based on green values of two green pixels within a 2×2 pixel pattern contained in the block data, and
to output a color image pixel correspondingly with the pixel pattern to have
(1) a blue value of the blue pixel,
(2) the computed red value and
(3) the computed green value.

5. The image processing apparatus of claim 4,
wherein the contrast boundary estimation section computes green value differences between the green values of vertical and horizontal pairs of the green pixels in the block data,
wherein the contrast boundary estimation section estimates a first contrast boundary direction from the red difference values and a second contrast boundary direction from the green difference values, and
wherein the pixel interpolation processing section computes the red value based on the red values of the four red pixels within the block data according to the first contrast boundary direction, and computes the computed green value based on the green values of the two green pixels within the pixel pattern according to the second contrast boundary direction.

6. The image processing apparatus of claim 4,
wherein the contrast boundary estimation section computes green value differences between the green values of vertical and horizontal pairs of the green pixels in the block data,
wherein the contrast boundary estimation section estimates a first contrast boundary direction from the red difference values and a second contrast boundary direction from the green difference values, and
wherein the pixel interpolation processing section
computes the computed green value based on the green values of the horizontal pair of the green pixels within the 3×3 pixel data block while weighting the green value of the green pixel within the 2×2 pixel pattern when the second contrast boundary direction is estimated to be in a horizontal direction, and
computes the green value based on the green values of the vertical pair of the green pixels within the 3×3 pixel data block while weighting the green value of the green pixel within the 2×2 pixel pattern when the second contrast boundary direction is estimated to be in a vertical direction.

7. An image processing method comprising:
receiving image data in which rows of alternately disposed blue pixels and green pixels and rows of alternately disposed green pixels and red pixels are alternately disposed along a column direction;
acquiring 3×3 pixel block data from the image data to have one red pixel positioned at a center, four blue pixels positioned at corners and four green pixels positioned respectively at above/below/left/right portions of the center;
computing, executed by a computer, blue value differences between blue values of diagonal pairs of the blue pixels in the block data;
estimating a direction of a contrast boundary in the block data based on the blue value differences;
computing, executed by a computer, a blue value based on the blue values of the four blue pixels within the block data according to the estimated direction of the contrast boundary;
computing, executed by a computer, a green value based on green values of two green pixels within a 2×2 pixel pattern contained in the block data; and
outputting a color image pixel correspondingly with the pixel pattern to have
(1) a red value of the red pixel,
(2) the computed blue value and
(3) the computed green value.

8. An image processing method comprising:
receiving image data in which rows of alternately disposed blue pixels and green pixels and rows of alternately disposed green pixels and red pixels are alternately disposed along a column direction;
acquiring 3×3 pixel block data from the image data to have one blue pixel positioned at a center, four red pixels positioned at corners and four green pixels positioned respectively at above/below/left/right portions of the center;
computing, executed by a computer, red value differences between red values of diagonal pairs of the red pixels in the block data;
estimating a direction of a contrast boundary in the block data based on the red value differences;
computing, executed by a computer, a red value based on the red values of the four red pixels within the block data according to the estimated direction of the contrast boundary;
computing, executed by a computer, a green value based on green values of two green pixels within a 2×2 pixel pattern contained in the block data; and
outputting a color image pixel correspondingly with the pixel pattern to have
(1) a blue value of the blue pixel,
(2) the computed red value and
(3) the computed green value.

* * * * *